(12) United States Patent
Fukui et al.

(10) Patent No.: US 6,727,566 B1
(45) Date of Patent: Apr. 27, 2004

(54) TRANSPARENT SUBSTRATE WITH CONDUCTIVE MULTILAYER ANTI REFLECTION FILM, TRANSPARENT TOUCH PANEL USING THE TRANSPARENT SUBSTRATE WITH MULTILAYER ANTI REFLECTION FILM AND ELECTRONIC APPARATUS USING THE TOUCH PANEL

(75) Inventors: Toshiharu Fukui, Nara (JP); Akira Nakanishi, Hirakata (JP); Hiroshi Moroi, Katano (JP); Jun Katsuragawa, Okazaki (JP)

(73) Assignees: Matsushita Electric Industrial Co., Ltd., Osaka (JP); Nidek Co., Ltd., Aichi (JP)

( * ) Notice: Subject to any disclaimer, the term of this patent is extended or adjusted under 35 U.S.C. 154(b) by 0 days.

(21) Appl. No.: 10/148,310
(22) PCT Filed: Sep. 29, 2000
(86) PCT No.: PCT/JP00/06771
§ 371 (c)(1),
(2), (4) Date: Oct. 10, 2002
(87) PCT Pub. No.: WO02/29830
PCT Pub. Date: Apr. 11, 2002

(51) Int. Cl.$^7$ ............................................ H01L 31/0232
(52) U.S. Cl. .................. 257/437; 257/431; 257/E21.029
(58) Field of Search ................................ 257/437, 431, 257/E21.029

(56) References Cited

U.S. PATENT DOCUMENTS 6,078,139 A * 6/2000 Ochiai et al. ............... 313/582
6,171,663 B1 * 1/2001 Hanada et al. .............. 349/139
2001/0055673 A1 * 12/2001 Getz ........................... 428/212

FOREIGN PATENT DOCUMENTS

| JP | 63-265625 | 11/1988 |
| JP | 4-154647 | 5/1992 |
| JP | 8-109043 | 4/1996 |
| JP | 11-110110 | 4/1999 |
| JP | 11-286066 | 10/1999 |
| JP | 2000-171602 | 6/2000 |
| JP | 2000-215734 | 8/2000 |
| JP | 2001-126504 | 5/2001 |

* cited by examiner

Primary Examiner—David Nelms
Assistant Examiner—Tu-Tu Ho
(74) Attorney, Agent, or Firm—Dellett & Walters

(57) ABSTRACT

With objectives of providing with a transparent board with conductive multi-layer antireflection thin films, under condition of high transmissivity not only on a glass substrate but also on a non-glass transparent substrate with property of demanded electrical resistance at the most exterior surface, this invention laminates at least three layers of thin films on a transparent substrate, in which the transparent dielectric $1^{st}$-layer thin film on the substrate that has a higher refractive index than the substrate has, the transparent dielectric $2^{nd}$-layer thin film next to the 1st layer that has a lower refractive index than the substrate has, and the most exterior transparent conductive transparent thin film that includes weight percentage no less than 20% of $SnO_2$.

16 Claims, 8 Drawing Sheets

TRANSPARENT SUBSTRATE WITH CONDUCTIVE MULTILAYER ANTI REFLECTION FILM, TRANSPARENT TOUCH PANEL USING THE TRANSPARENT SUBSTRATE WITH MULTILAYER ANTI REFLECTION FILM AND ELECTRONIC APPARATUS USING THE TOUCH PANEL

This application is a 371 of International Application No. PCT/JP00/06771, filed Sep. 9, 2000.

FIELD OF THE INVENTION

The present invention relates to a transparent board with conductive multi-layer antireflection films, in further details, relates to a transparent touch panel using this transparent board with multi-layer antireflection films and electronic equipment with this transparent touch panel.

BACKGROUND OF THE INVENTION

At present, it is known that displaying devices of liquid crystals and electrodes for touch panels are made using a transparent conductive film of indium tin oxide (ITO) or the like formed on a transparent substrate such as glass or plastic. The transparent baseboard with multi-layer antireflection films for such purposes is designed to prevent reflection using transparent thin-film interference. However, the transparent baseboard with multi-layer antireflection thin films applied to touch panels for example, may present high transmissivity with antireflection effects, has drawback of being scratched with touch-pen-sliding on the surface of the conductive thin film that results in loss of desired surface electrical resistance and in insufficient functions as a touch panel.

Considering and by solving technical problems mentioned above, this invention intends to provide with a transparent board with conductive multi-layer antireflection films of high transmissivity and durability, further more with a transparent touch panel using this transparent board using multi-layer antireflection films, and with electronic equipment using this transparent touch panel.

SUMMARY OF THE INVENTION

To solve the problems above mentioned, the present invention is comprising following configurations:

(1) A transparent baseboard with conductive multi-layer transparent films on a transparent substrate, comprising at least three-layer antireflection thin films on the transparent substrate, including dielectric transparent $1^{st}$-layer thin film on the substrate that has a refractive index higher than the substrate, and a transparent dielectric $2^{nd}$-layer thin film on the $1^{st}$ layer that has a lower refractive index than the substrate, and the most exterior conductive 3rd-layer thin film that consists of ITO with at least 20% weight of $SnO_2$, offers high transmissivity and durability by preventing optical reflections using thin film interference.

(2) The transparent baseboard with conductive multi-layer antireflection transparent films on a transparent substrate described in (1) comprising the thickness of each layer of the thin films is determined taking into account the refraction index relationship between the transparent substrate and each thin film, wherein the thin films of different refraction index are laid on in order to prevent reflection by transparent-thin-film interference and offers high transmissivity and durability.

(3) In the conductive transparent baseboard with conductive multi-layer antireflection t films described in (1), the $3^{rd}$-layer thin film has thickness that offers desired surface resistance and the $1^{st}$- and $2^{nd}$-layer thin films have thickness that satisfies a theoretical view-sense reflection index less than a proper value by adjusting its desired thickness as a variable, and the thickness nd of the $1^{st}$ layer meets the inequality nd>λ/4. This property presents easy control of film thickness in production process and preferable optical directionality.

(4) In the transparent baseboard with multi-layer antireflection transparent films described in (1), said $3^{rd}$-layer thin film comprising said ITO with $SnO_2$ of weight percentage no less than 20% and no more than 30% consists of conductive multi-layer antireflection thin films of different refraction indexes and presents high transmissivity and durability by using thin-film interference to prevent optical reflections.

(5) The transparent baseboard with multi-layer antireflection transparent films described in (1) offers high durability such that said $3^{rd}$-layer thin film incurs linearity loss no more than 1.5% after undergoing pen-sliding test of 100 thousand times with 250 gram loading weight.

(6) Transparent conductive multi-layer thin films consisting of a transparent fix substrate, a transparent flexible substrate situated away from the fix substrate, and connecting means to external electrical circuits on the transparent flexible substrate, wherein either of said facing transparent fix substrate or said transparent flexible substrate has conductive multi-layer antireflection films of at least 3 layers such as a $1^{st}$-layer transparent dielectric thin film with refraction index higher than its substrate, a $2^{nd}$-layer transparent dielectric thin film with refraction index lower than its substrate, and a $3^{rd}$-layer conductive transparent thin film comprising said $3^{rd}$-layer thin film that consists of ITO with no less than 20% weight $SnO_2$.

(7) The conductive multi-layer antireflection thin films for the transparent touch panel described in (6) are laid on the substrate in order to prevent reflection comprising the thickness of each layer of the thin films is determined taking into account the refraction index relationship between the substrate and each thin film.

(8) The transparent touch panel described in (6) has three layers of thin films comprising thickness of the $3^{rd}$-layer thin film offers desired surface resistance and the $1^{st}$- and $2^{nd}$-layer thin films have thickness that satisfies a theoretical view-sense reflection index less than a proper value by adjusting its desired thickness as a variable, and the thickness nd of the $1^{st}$ layer meets the inequality nd>λ/4.

(9) The $3^{rd}$-layer thin film for the touch panel described in (6) comprises conductivity by using ITO with $SnO_2$ of weight percentage no less than 20% and no more than 30%

(10) The touch panel described in (6) comprises the durable $3^{rd}$-layer thin film that only incurs linearity loss no more than 1.5% after undergoing pen-sliding test of 100 thousand times with 250 gram loading weight

(11) A configuration comprising a display furnished with a transparent touch panel on the display side, and a control circuit that processes control signals obtained by pushing the transparent touch panel that consists of a transparent fix substrate, a transparent flexible substrate situated away from the fix substrate, and connecting means to external electrical circuits on the transparent flexible substrate, wherein either of said facing transparent fix substrate or said transparent flexible substrate has conductive multi-layer antireflection films of at least 3 layers such as a $1^{st}$-layer transparent dielectric thin film with refraction index higher than its substrate, a $2^{nd}$-layer transparent dielectric thin film with refraction index lower than its substrate, and a most exterior 3$^{rd}$-layer conductive transparent thin film of ITO with no less than 20% weight of SnO$_2$.

DESCRIPTION OF THE PREFERRED EMBODIMENT

Embodiment 1

Conductive multi-layer antireflection films in Embodiment 1 are explained in the following using figures.

Figure 1:
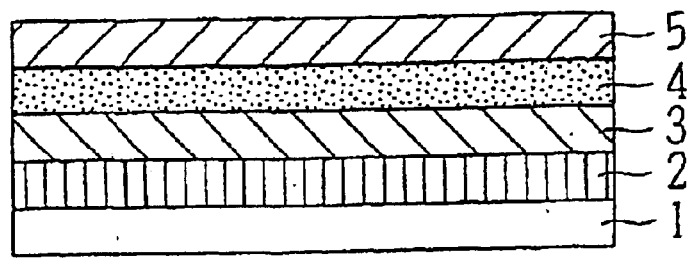
FIG. 1 is an outline cross section of the configuration of thin films.

FIG. 1 shows an outline of the idea to configure the conductive multi-layer antireflection films in Embodiment 1.

1 is the transparent substrate. The substrate 1 is sufficient at ordinary obtainable quality with refraction index ranging from 1.48 to 1.7. For example, optically transparent substrates are available such as glass with refraction index 1.48 to 1.70, polycarbonate with refraction index 1.59, polyethylene terephthalate with refraction index 1.66.

2 is a thin film on the substrate 1 that is formed before conductive multi-layer thin films are laid. This thin film 2 is coated before laying multi-layer thin films in order to harden the surface of the substrate 1 for protection against scratches and the like, and to make the conductive multi-layer thin films stick closely on the substrate 1, which is called "undercoat" in the following. Generally, the undercoat layer adopts a hard coat that enables surface protection and close stick to the substrate 1.

Alternatively, directly laying the conductive multi-layer thin films on the substrate 1 without the undercoat 2 may be possible. However, this method is not preferable considering the surface protection and close sticking. Instead of hard coat, undercoat using vacuum evaporation on the substrate 1 may be an alternative for surface protection and close stick.

In any case, the thickness of the undercoat is desired not to cause optical defects. Furthermore, coating antireflection film on the back surface of the substrate 1 (opposite side of the films) may improve transmissivity.

3 is a transparent dielectric 1$^{st}$-layer thin film that is laid on the undercoat and has higher refraction index than that of substrate 1. This dielectric material is properly chosen considering the substrate 1, where the refraction index of the transparent dielectric material must be higher than 1.48 of the lowest index of the substrate 1. The material whose refraction index ranges from 1.50 to 2.50 is well used under conditions of reasonable cost and stable growth of the film. For example, for main component of the 1st film 3, listed are ZrO$_2$ with refraction index 1.9, TiO$_2$ with refraction index 2.2, Al$_2$O$_3$ with refraction index 1.6. The optical thickness nd (simply written "thickness" in the following) is desired to be more than 10 nm and less than 600 nm, more preferably more than 50 nm and less than 550 nm. Furthermore, considering the controllability of the thickness in the film growth, more than $\lambda/4$ is preferable and considering productivity, less than $\lambda$ is preferable. Thickness either thicker or thinner than this range presents poorer antireflection effects.

4 is a transparent dielectric 2$^{nd}$-layer thin film that is laid on the 1$^{st}$-layer thin film 3 and has a lower refraction index than that of the substrate 1. The transparent dielectric material for the 2$^{nd}$-layer thin film 4 is properly chosen considering the material of substrate 1, where the refraction index of the transparent dielectric material must be lower than 1.70 of the highest index of the substrate 1. The material whose refraction index ranges from 1.35 to 1.60 is well used under conditions of reasonable cost and stable growth of the film. For example, for a main component of the 2$^{nd}$-layer thin film 4, listed are SiO$_2$ with refraction index 1.46, MgF$_2$ with refraction index 1.38. The thickness of the 2$^{nd}$-layer thin film 4 is desired to be more than 10 nm and less than 600 nm, more preferably more than 50 nm and less than 550 nm. Thickness either thicker or thinner than this range presents poorer antireflection effects.

5 is the most exterior conductive 3$^{rd}$-layer thin film laid on the 2$^{nd}$-layer thin film 4. The 3$^{rd}$-layer thin film 5 is, for example, made of transparent conductive materials such as ITO, ATO, SnO$_2$, and the mixture of In and Zn. The surface resistance is determined with the thickness of the 3$^{rd}$-layer thin film 5, that is, high resistance is obtained with a thin film and low resistance with a thick film. The electrical resistance is chosen considering the application. For applications such as an electro-optical device, a photo-electric transducer, a liquid crystal device, and a touch panel, the surface resistance is demanded more than 100 $\Omega/\square$ less than 5000 $\Omega/\square$, further preferably, more than 100 $\Omega/\square$ less than 1000 $\Omega/\square$. The thickness of the 3$^{rd}$-layer thin film 5 that corresponds to this surface resistance is demanded more than 10 nm and less than 1000 nm, and further preferably more than 20 nm and less than 300 nm.

How the optimum thickness of each film is determined is shown in the following.

Firstly, thickness of the most exterior surface (the $3^{rd}$-layer film 5 here) is determined to provide with the best surface resistance according to the application. Next, under condition of fixed refraction indexes of materials for the $1^{st}$-layer thin film 3 and the $2^{nd}$-layer thin film 4, the physical thickness of the $1^{st}$-layer thin film 3 and the $2^{nd}$-layer film 4 is varied using an optimization algorithm. Accordingly, the thickness of the $1^{st}$-layer thin film 3 and the $2^{nd}$-layer thin film 4 that presents the highest transmissivity or the lowest reflectance is determined.

The optimization algorithm is obtained with various optimization algorithms using merit function, for example, Adaptive Random Search method, Modified Gradient method, Monte Carlo method, and Simulated Annealing method. In Embodiment 1, the thickness of the $1^{st}$-layer thin film 3 and the $2^{nd}$-layer thin film 4 is determined so that the view-sense reflection index Y of tri-stimuli is minimized taking into account the optical spectrum analysis with characteristic matrix and Equation (1).

$$\overline{y}=(\lambda) \quad \text{(Eq. 1)}$$

Here, a trial and error method is applied for optimization and the minimum value is not always chosen. However, since the transparent board with the conductive multi-layer antireflection films in the present invention provides with excellent performance, determining thickness of the $1^{st}$- and $2^{nd}$-layer thin films 3 and 4 by using a coarse optimum value away by around 0.2 to 0.3 from the genuine optimum in the view-sense reflection index presents sufficiently better transmissivity than previous substrates with conductive multi-layer antireflection films.

Examples to grow the conductive multi-layer films above described $1^{st}$-, $2^{nd}$-, and $3^{rd}$-layer thin films 3, 4, 5, are listed such as thermal deposition and sputtering methods as categorized in physical vapor deposition (PVD), and also listed such as plating methods and chemical vapor deposition methods as categorized in CVD. Although all these film-growth methods are available for the present invention, the vacuum evaporation or sputtering method without process using high temperature is preferred to grow the conductive multi-layer thin films on the plastic substrate so that the processing heat does not deform the plastic substrate.

In controlling the film thickness in the vacuum evaporation or sputtering method, it is easy and practical to use photo-electrical measurement with optical film-thickness gauge on the deposition equipment This photo-electrical measurement senses a change in brightness by casting a chopped beam of monotone light onto a monitor glass and throwing the reflected light into the film-thickness gauge.

The brightness changes depending on the film thickness on the substrate and the reflection of the monotone light becomes maximum (minimum) when the film thickness (nd) equals $\lambda/4$. If the refraction index of the deposition film is higher than the substrate, the reflection increases and if lower, it decreases. Accordingly, controlling the film thickness at $\lambda/4$ with the film thickness gauge is so easy just to find the maximum (minimum) of the reflection.

However, the optical film thickness in the present invention is not always integer multiple of $\lambda/4$, because the thickness of the film at each layer on the substrate is optimized so that the view-sense reflection indexes in the multiple layer films are minimized by varying the optical film thickness under condition that the thickness of the most exterior transparent conductive film is determined in accordance with the application.

In addition, the refraction index of the thin film delicately depends upon the states in the deposition equipment and the heating process of the material, therefore, the position and the time for the maximum (minimum) of the reflected light unstably varies. Accordingly, the film thickness is controlled with anticipation of maximum (minimum) of the reflected light at $\lambda/4$ following the experimental experiences if the control is intended within the film thickness below $\lambda/4$. As a result, the thickness control especially of the $1^{st}$-layer thin film 3 is preferred above $\lambda/4$. Furthermore, it is preferable that optical thin films of the $1^{st}$-layer 3 and the undercoat-layer 2 are grown up altogether not less than $\lambda/4$.

Tables 1 and 2 show the optimum configurations of the film thickness in cases when the film thickness control is not considered and is considered, that is, the thickness of the 1st-layer thin film is adjusted at less than $\lambda/4$, where the substrate is made of polycarbonate with refraction index 1.59 and the thickness of the ITO film is determined so that the surface resistance becomes 600 $\Omega/\square$ in Table 1 and 550 $\Omega/\square$ in Table 2.

TABLE 1

Optimum configurations with and without film-thickness control.

| | TiO$_2$ | SiO$_2$ | ITO | View-sense Reflection Index | Surface Resistance |
|---|---|---|---|---|---|
| With Film-thickness Control | 67.5 nm | 117.7 nm | 27.5 nm | 0.58% | 600 $\Omega/\square$ |
| Without Film-thickness Control | 206 nm | 65 nm | 27.5 nm | 0.69% | 600 $\Omega/\square$ |

TABLE 2

Optimum configurations with and without film-thickness control.

| | TiO$_2$ | SiO$_2$ | ITO | View-sense Reflection Index | Surface Resistance |
|---|---|---|---|---|---|
| With Film-thickness Control | 65 nm | 115 nm | 30 nm | 0.63% | 550 $\Omega/\square$ |
| Without Film-thickness Control | 204 nm | 62 nm | 30 nm | 0.72% | 550 $\Omega/\square$ |

As described above, the method determining optimum film thickness one by one regardless the thickness control presents a little better view-sense reflection index. However, this difference is negligible for human sensitivity. Furthermore, theoretical view-sense reflection index became less than 1%, within surface resistance range between 250 $\Omega/\square$ and 750 $\Omega/\square$ by separately optimizing the film thickness of the $1^{st}$-layer thin film 3 and the $2^{nd}$-layer thin film 4. This method offers very high performance of the transparent board with conductive multi-layer antireflection films resulting in transmissivity of 90%. As Tables 1 and 2 show that view-sense reflection index is around the range from 0.6 to 0.7, this method seems to present advantage of reflection index by 0.5 over previous transparent board with multi-layer antireflection films.

Accordingly, this method affords allowance of view-sense reflection index by 0.2 to 0.3 and results in more capability of treatment for protecting the film surface than the conventional ones. The same effect is also obtained if is adopted 4-layer films altogether by inserting a film of a lower refraction index than the substrate 1 between the 1$^{st}$-layer thin film 3 and the undercoat layer 2, while the thickness of the films are determined with the optimization algorithm. Furthermore, durability of the most exterior conductive thin film (the 3$^{rd}$-layer thin film 5 here) for the baseboard with conductive multi-layer antireflection films can be enhanced by controlling the weight percentage of SnO$_2$ in ITO, if ITO is adopted as a conductive material at the most exterior layer.

Previously, the weight percentage of SnO$_2$ in ITO used to be around 5%, because it is considered to offer the best specific resistance and high transmissivity. In Embodiment 1, specific resistance is raised by increasing the weight percentage of SnO$_2$, and the thickness of ITO is increased to provide with the desired resistance, which offers good durability. The weight percentage of SnO$_2$ is demanded to be more than 20% and less than 30%, preferably more than 20% and less than 25%. On the other hand, a weight percentage more than 30% of SnO$_2$ in ITO presents better durability but results in poorer directivity and less controllability on film thickness of ITO to provide with the desired resistance.

EXAMPLE 1

A polycarbonate hard-coated substrate with refraction index 1.59 is prepared and the surface is cleaned with supersonic washer. The substrate is set in vacuum evaporation equipment after drying, and then air is discharged. The equipment is heated up to 130 centigrade Celsius with microwave heater and halogen heater until the film is fully grown on the substrate and air is leaked. The microwave heater and the halogen heater both heat up the substrate. The chemical substance should be prepared for growth of the 1$^{st}$-, the 2$^{nd}$-, and the 3$^{rd}$-layer thin films in the equipment.

One hour after the heating is started, film growth is begun. The 1$^{st}$-layer thin film on the bard-coat surface as undercoating is grown out of main component ZrO$_2$ using chemical substance (ZrO$_2$ tablet, Optron Co. product) prepared in the equipment The time for deposition is set 3 minutes 30 seconds and the film thickness is set 140 nm. Next step grows the 2$^{nd}$-layer thin film onto the 1$^{st}$-layer thin film with main component of SiO$_2$ using granular SiO$_2$ by Optron Co. The duration time for deposition is around 5 minutes and the film thickness is set to be 80 nm.

Next, the 3$^{rd}$-layer thin film of main component ITO is grown using chemical substance (ITO tablet, Optron Co. product) for the deposition. During the 3$^{rd}$-layer thin film is grown, a plasma process (RF process) is applied. The thickness of the film is chosen as 35 nm.

Figure 2:
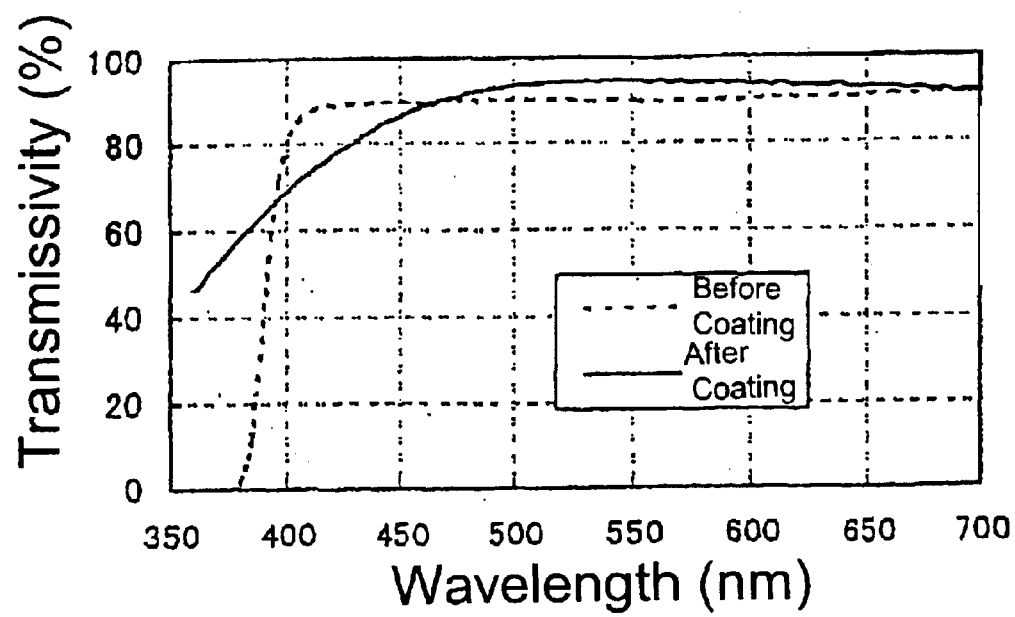
FIG. 2 is the transmissivity of wavelength at the film on the transparent substrate in Example 1 of the present invention.
Figure 11:
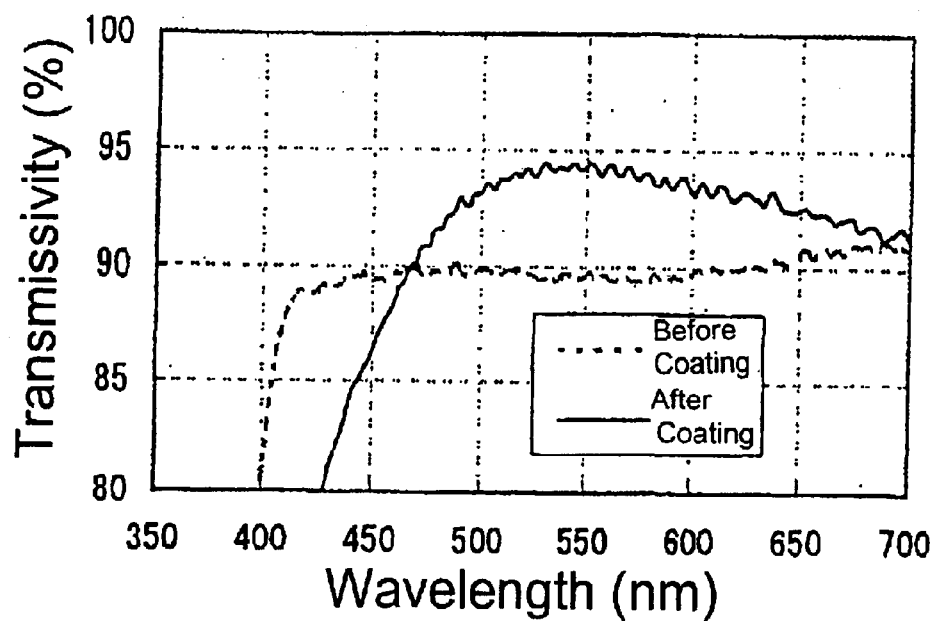
FIG. 11 is the transmissivity around the peak of wavelength at the film on the transparent substrate in Example 1 of the present invention.

The multi-conductive-layer antireflection films obtained with the process described above become the test sample after slow cooling. As shown in FIGS. 2 and 11, where a dotted line presents the transmissivity of the substrate before the film growth, and a solid line does after the growth. This sample presents a peak at wavelength of 530 nm, whose transmissivity was 94.5% at 550 nm of wavelength. View-sense transmissivity gauge MODEL304 by Asahi Bunkosha showed 93.5% of view-sense transmissivity. The surface resistance was 550 Ω/□.

EXAMPLE 2

Figure 3:
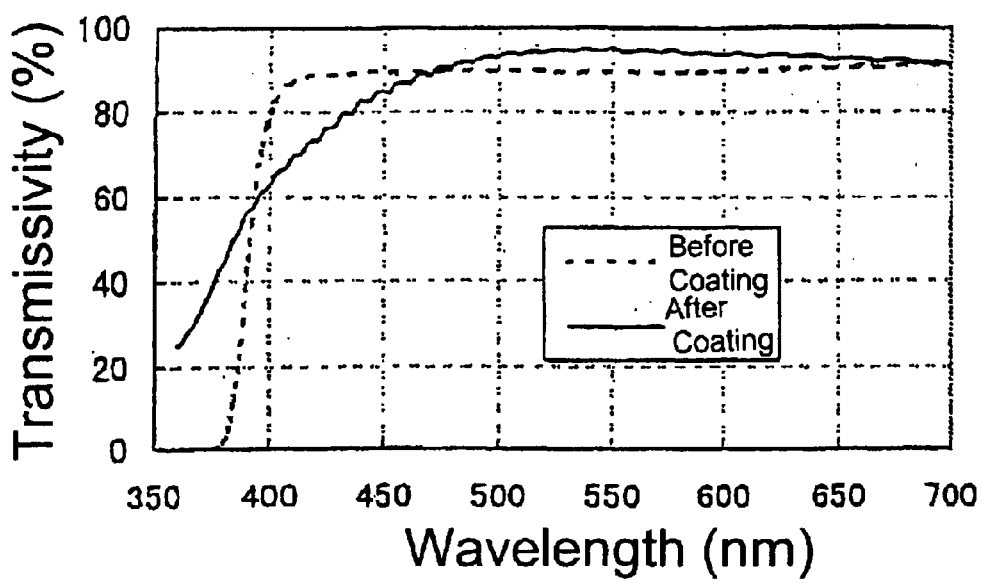
FIG. 3 is the transmissivity of wavelength at the film on the transparent substrate in Example 2 of the present invention.
Figure 12:
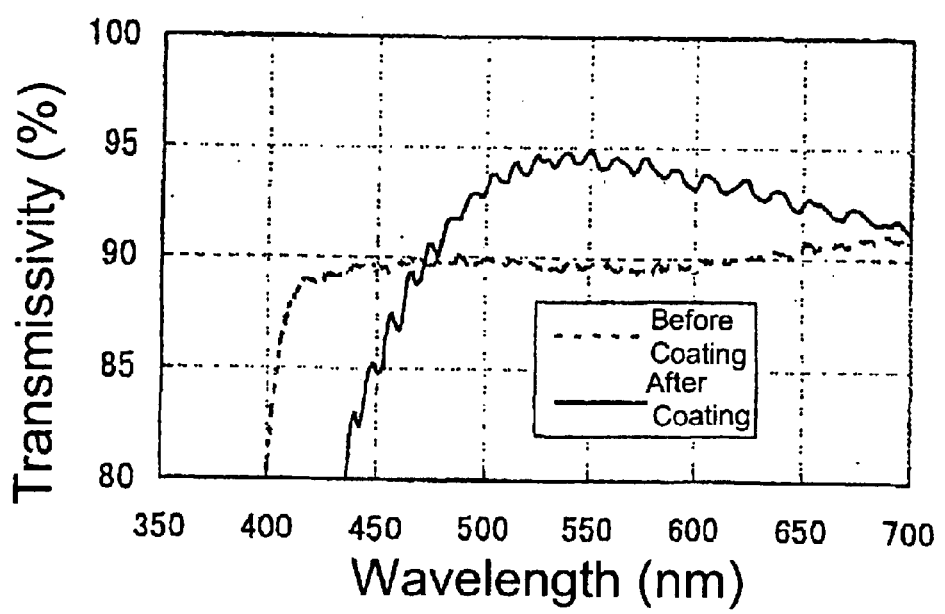
FIG. 12 is the transmissivity around the peak of wavelength at the film on the transparent substrate in Example 2 of the present invention.

A polycarbonate hard-coated substrate exactly the same as Example 1 is set in the vacuum evaporation equipment and the 1$^{st}$-layer thin film of main component TiO$_2$ is grown. The time for deposition was 4 minutes and the thickness was 65 nm. Then thin film of main component SiO$_2$ is grown with thickness of 115 nm. The 2$^{nd}$-layer 3$^{rd}$-layer thin film is grown out of main component ITO with thickness of 30 nm. FIGS. 3 and 12 show the transmissivity of the conductive multi-layer antireflection thin films above obtained, which presents a peak at 540 nm of wavelength and 94.5% of transmissivity at 550 nm of wavelength and 93.5% of view-sense transmissivity. It presents 550 Ω/□ of surface resistance.

EXAMPLE 3

A polycarbonate hard-coated substrate that is the same as Example 1 is set in the vacuum evaporation equipment and the 1$^{st}$-layer thin film of main component TiO$_2$ is grown. The time for deposition was 4 minutes and the thickness was 204 nm. And the 2nd-layer thin film of main component SiO$_2$ as the 2nd layer is grown with thickness of 62 nm. The 3rd-layer thin film is grown of main component ITO with thickness of 30 nm. The view-sense transmissivity of 94.5% was obtained. It presents 550 Ω/□ of surface resistance.

EXAMPLE 4

Durability change of the baseboard with conductive multi-layered antireflection films is studied by altering the percentage of SnO$_2$ in ITO in Example 4. On the polycarbonate hardcoated substrate that is the same as Example 1, a 1$^{st}$-layer thin film of main component ZrO$_2$, a 2$^{nd}$-layer thin film of main component SiO$_2$, and a 3$^{rd}$-layer thin film of main component ITO are grown. The weight percentage of SnO$_2$ in ITO of the 3$^{rd}$-layer thin film is controlled as 5%, 10%, 20%, 25%, and 30% respectively when each film is grown up. The thickness of ITO is controlled to provide with surface resistance around 300 Ω/□ and the thickness of the 1$^{st}$- and the 2$^{nd}$-layer thin films are determined with the optimizing algorithm formerly described.

The durability is studied with a pen-sliding test that a polyacetal stylus scrapes one place back and forth on the most exterior surface of the board at constant load weight. An optical linearity loss and visible presence of opaque scratch lines are examined after the pen-sliding test with 250 gram weight and 100 thousand times roundtrip. The results are shown in Table 3, where "good" means no visible opaque scratch, "fair" means slightly visible opaque scratch lines, and "NG" means obviously visible opaque scratch lines.

TABLE 3

Durability test results over Sn weight percentage.

| Sn weight Percentage | Film Configuration Optical thickness) | | | View Sense Transmissivity (%) | After Pen-sliding (250 g, 100 k times) | |
|---|---|---|---|---|---|---|
| | 1st-layer $ZrO_2$ (nm) | 2nd-layer $SiO_2$ (nm) | 3rd-layer ITO (nm) | | Linearity Loss (%) | Opaque Scratch |
| 5% | 135 | 78 | 38 | 93.4 | 46 | N.G. |
| 10% | 136 | 70 | 45 | 93.2 | 5.54 | N.G. |
| | 136 | 70 | 45 | 93.3 | 3.64 | N.G. |
| 20% | 138 | 59 | 55 | 93.3 | 1.40 | Fair |
| 25% | 136 | 51 | 65 | 93.1 | 1.12 | Good |
| 30% | 136 | 43 | 75 | 92.5 | 1.00 | Good |

As shown in Table 3, while a weight percentage 5% of $SnO_2$ in ITO presents 40% loss of linearity after the pen-sliding test with 250 gram load at 100 thousand times, the weight percentage around 20% to 30% presents excellent durability of linearity loss such as around 1% after the same test. As far as the view sense transmissivity, the weight percentage no less than 20% and no more than 30% of $SnO_2$ presents good transmissivity around 93%.

COMPARISON EXAMPLE 1

Figure 4:
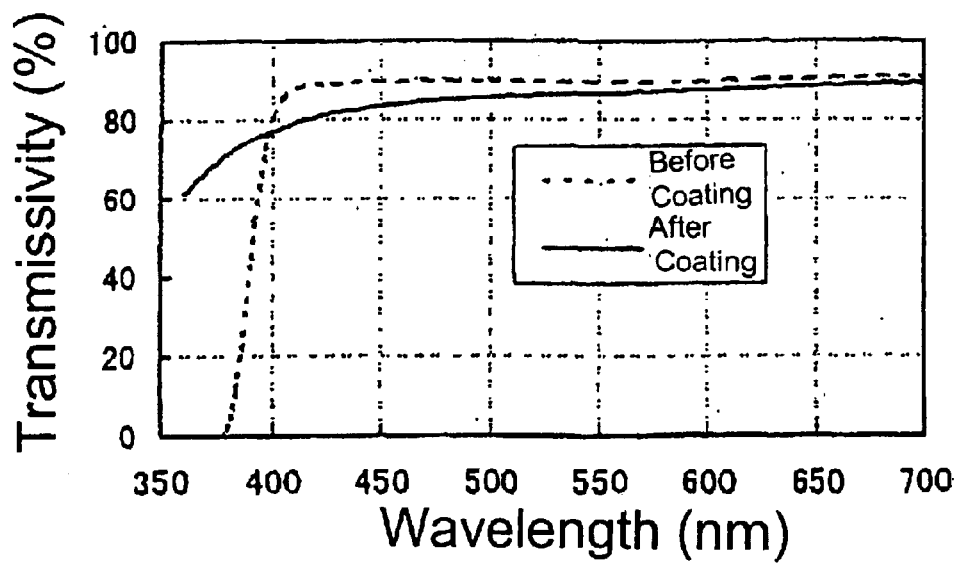
FIG. 4 is transmissivity of wavelength at the film on the transparent substrate in Comparison Example 1 of the present invention.

A polycarbonate hard-coated substrate that is the same as Example 1 is set in the vacuum evaporation equipment and the $1^{st}$-layer thin film of main component TIO is grown with thickness 40 nm. FIG. 4 is the transmissivity of the conductive multi-layer antireflection thin film above obtained, which presents 86.6% of transmissivity at 550 nm of wavelength and 89.6% of view-sense transmissivity. It presents 550 Ω/□ of surface resistance.

COMPARISON EXAMPLE 2

Figure 13:
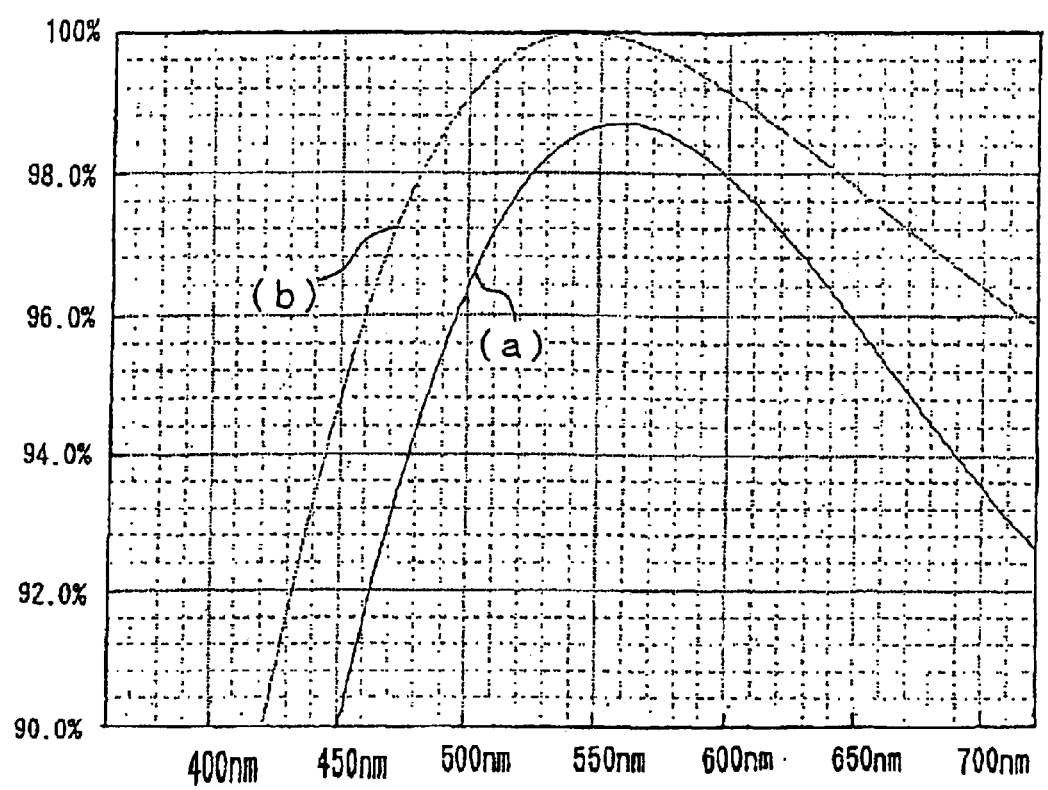
FIG. 13 is the transmissivity around the peak of wavelength at the film on the transparent substrate in Comparison Example 2 of the present invention.

A transmissivity (theoretical value) is obtained when the same substrate as Example 1 is used, the $3^{rd}$-layer thin film is grown out of ITO with thickness 30nm, and the $1^{st}$-layer thin film is grown up to λ/4 (λ=500 nm), the thickness of the $2^{nd}$-layer and the $3^{rd}$-layer thin films together is controlled to be λ/4. Also, the transmissivity (theoretical value) is obtained when the same substrate as the Example 1 is used, the conductive $3^{rd}$-layer thin film is grown as the same, and the thickness of the $1^{st}$-layer and the $2^{nd}$-layer thin films is determined with optimization algorithm. The results are shown in FIG. 13. Curve (a) shows the index at the film thickness of λ/4, Curve (b) shows the index with the optimization algorithm. The thickness of the $1^{st}$-layer thin film of $TiO_2$ is 125 nm in Curve (a) and 65 nm in Curve (b) respectively. The thickness of the 2nd-layer thin film of $SiO_2$ is 95 nm in Curve (a) and 115 nm in Curve (b) respectively.

As shown above, despite changes in the main chemical components for the thin films, the layer configuration in the present invention achieved 94.5% of transmissivity at 550 nm of wavelength under condition of 550 Ω/□ of surface resistance. This is outstanding performance of transmissivity when the plastic substrate is used that is less transparent than the glass substrate. On the other hand, Comparison Example 1 that adopts different layer configuration out of Examples 1, 2, and 3, presented rather poor transmissivity of 86.6% at 550 nm of wavelength.

Generally, it is known analytically and by experiences that the most exterior layer should be a film with low refraction index and its film thickness should be λ/2, λ/4, and so on. However, if the conductive multi-layer films are used for touch panels or the like, conductivity is essential for the most exterior layer and so the thickness is restricted by its applications. The thickness of the $3^{rd}$-layer thin film tends not to present desired transmissivity when the thickness relationship between the $2^{nd}$-layer and the $3^{rd}$-layer thin films is restricted as shown in Curve (a) in Comparison Example 2. The present invention does not restrict the thickness of each layer film at λ/2, λ/4, or the like, but configures conductive multi-layer films by determining the thickness of each layer film using the optimization algorithm considering the allowed thickness range under condition of the refraction index of each layer and the thickness of the $3^{rd}$-layer (most exterior) film. This configuration results in an excellent transmissivity of antireflection films than the previous.

Embodiment 2

Figure 5:
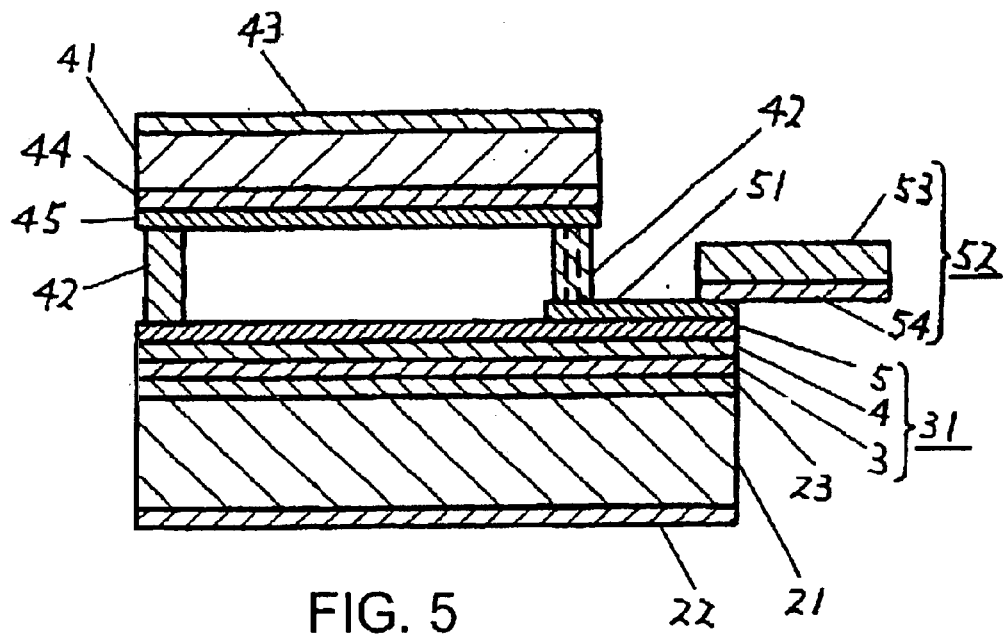
FIG. 5 is a cross section of the transparent touch panel using the transparent substrate with conductive multi-layer antireflection films in Embodiment 2 of the present invention.

In the following, the transparent touch panel that uses the transparent board with the conductive multi-layer antireflection films in Embodiment 2 is explained with reference of figures. FIG. 5 is a section view of the transparent touch panel that uses the transparent board with the conductive multi-layer antireflection films in Embodiment 2. The very detailed explanation of the conductive multi-layer antireflection films in Embodiment 2 is omitted because it is the same as the three layered films consisting of the 1st-, the 2nd-, and the 3rd-layer thin films 3, 4, and 5 explained with FIG. 1 in Embodiment 1. The conductive multi-layer films consisting of at least three layers of the 1st-, the 2nd-, and the 3rd-layer thin films 3, 4, and 5 will be called "Conductive multi-layer antireflection films" in the following.

In the figure, 21 is a transparent fix substrate at the bottom side of which a hard coat layer 22 is equipped with of main component of acryl resin to prevent damage like scratches of the substrate 21 during production. For example, the chemical substance for the transparent fix substrate 21 is polycarbonate whose thickness is around 1.0 mm.

23 is an undercoat layer of main component acryl on the top surface of the transparent fix substrate 21. This undercoat 23 on the top surface of the transparent fix substrate 21 is covered before the conductive multi-layer films are grown in order to harden and protect the surface of the substrate 21 from scratches, and furthermore to help closer stick of the grown antireflection film on the substrate 21. Generally, the undercoat layer 23 adopts a hard coat that enables surface protection of transparent fix substrate 21 and close stick of the conductive multi-layer antireflection films to the substrate 21.

Alternatively, directly laying the multi-films on the fix transparent substrate 21 without the undercoat layer 23 may be possible. However, as previously described, this process is not preferable considering the surface protection and closer sticking. Pre-process of undercoating a hard coat on the top surface of the transparent fix substrate 21 is preferable for the purposes described above. Instead of hard coat, simply undercoat using vacuum evaporation on the fix transparent substrate 21 may be an alternative for surface protection and closer sticking. In any case, the thickness of the undercoat is desired not to cause optical defects.

3 is a 1st-layer dielectric transparent thin film that is laid on the undercoat layer 23 of the transparent fix substrate 21. The 1st-layer film 3 is of higher refraction index than that of the transparent fix substrate 21. This dielectric material is properly chosen considering the fix substrate 21. The dielectric material whose refraction index ranges from 1.50 to 2.50 is well used. For example, for main component of the $1^{st}$-layer thin film 3, listed are $ZrO_2$ with refraction index 1.9, $TiO_2$ with refraction index 2.2, $Al_2O_3$ with refraction index 1.6.

The thickness the $1^{st}$-layer thin film 3 is desired to be more than 10 nm and less than 600 nm, more preferably more than 50 nm and less than 550 nm. Furthermore, considering the thickness controllability in the film growth, more than $\lambda/4$ is preferable and considering productivity, less than $\lambda$ is preferable. Thickness either thicker or thinner than this presents poorer antireflection effects.

4 is a transparent dielectric 2nd-layer film that is laid on the $1^{st}$-layer thin film 3 and has lower refraction index than that of the transparent fix substrate 21. The dielectric material for the film 4 is properly chosen considering the transparent fix substrate 21. The material whose refraction index ranges from 1.35 to 1.6 is well used. For example, for main component of the 2nd film 4, listed are $SiO_2$ with refraction index 1.46, $MgF_2$ with refraction index 1.38. The thickness of the 2nd-layer thin film 4 is desired to be more than 10 nm and less than 600 nm, more preferably, more than 50 nm and less than 550 nm . Thickness either thicker or thinner than this presents poorer antireflection effects.

5 is a most exterior conductive $3^{rd}$-layer thin film laid on the 2nd-layer 4. The 3rd-layer thin film 5 is, for example, made of mainly ITO, ATO, and FATO. The surface electrical resistance is determined with the thickness of the 3rd-layer film 5, that is, higher resistance is obtained with a thinner film and lower resistance with a thicker film. The electrical resistance is chosen considering the applications. The surface resistance is demanded more than 100 $\Omega/\square$ less than 5000 $\Omega/\square$, further preferably, more than 100 $\Omega/\square$ less than 1000 $\Omega/\square$. The thickness of the 3rd-layer thin film 5 that determines the surface resistance is demanded more than 10 nm and less than 1000 nm, and further preferably more than 20 nm and less than 300 nm. At least these thin films of the $1^{st}$-layer 3, the $2^{nd}$ layer 4, and the 3rd layer 5 configure the conductive antireflection films 31.

41 is a transparent flexible substrate situated separately through insulator film 42 in between against the conductive antireflection film 31, on the top surface of which is equipped with the hard coat layer 43 of mainly acryl resin with hardness of 3H pencil on the flexible substrate that protects the flexible substrate 41. For example, as the chemical substance of the flexible substrate 41, is used polyethylene terephthalate whose thickness is around 0.175 mm.

44 is a transparent flexible substrate-side undercoat layer made of main component acryl coated on the bottom surface of the transparent flexible substrate 41. This transparent flexible substrate-side undercoat layer 44 is configured so that it hardens the transparent flexible substrate 41 to protect it from damage like scratches and increases sticking force between the thin film and the transparent flexible substrate 41.

45 is a fourth-layer transparent dielectric thin film configured on the lowest layer of the transparent flexible substrate-side undercoat layer 44. The main component of the fourth-layer thin film is, for example, ITO, ATO, and FATO. The surface electrical resistance is determined with the thickness of the fourth-layer thin film 45, that is, higher resistance is obtained with a thinner film and lower resistance with a thicker film. The electrical resistance is chosen considering the application. The surface resistance is demanded more than 100 $\Omega/\square$ and less than 5000 $\Omega/\square$, further preferably, more than 100 $\Omega/\square$ and less than 1000 $\Omega/\square$. The thickness of the fourth-layer thin film 45 that determines the surface resistance is demanded more than 10 nm and less than 1000 nm, and further preferably more than 20 nm and less than 300 nm.

51 is a connecting plate configured with silver paste that electrically connects the fourth-layer thin film 45 and the $3^{rd}$-layer thin film 5 in conductive antireflection film 31 and also connects to an external circuit 52 that will be described later. The external circuit 52 that is connected to the connecting plate 51 is equipped with a desired wiring pattern 54 on a flexible circuit board 53.

Following is explained an operation of the above configured transparent touch panel. When the top surface of the hard-coat layer 43 on the transparent flexible substrate is pushed with a pen or a finger, the pressure is transmitted to the transparent flexible substrate 41 and the conductive antireflection film 31, when the most exterior fourth-layer thin film 45 of the transparent flexible substrate 41 contacts the $3^{rd}$-layer thin film 5 of the conductive antireflection film 31. This contact puts the voltage out to the external circuit 52 as the desired control signal in potential proportion with the pressed position according to the loaded voltage at the edges of the fourth-layer thin film 45 and the $3^{rd}$-layer thin film 5.

In addition, the transparent flexible baseboard 41 in Embodiment 2 offers better reliability against damages from external forces by consisting of at least two films on the sticking layer.

Embodiment 3

In the following, is explained with references of figures a transparent touch panel that uses the conductive transparent baseboard with the multi-layer antireflection films in Embodiment 3.

Figure 6:
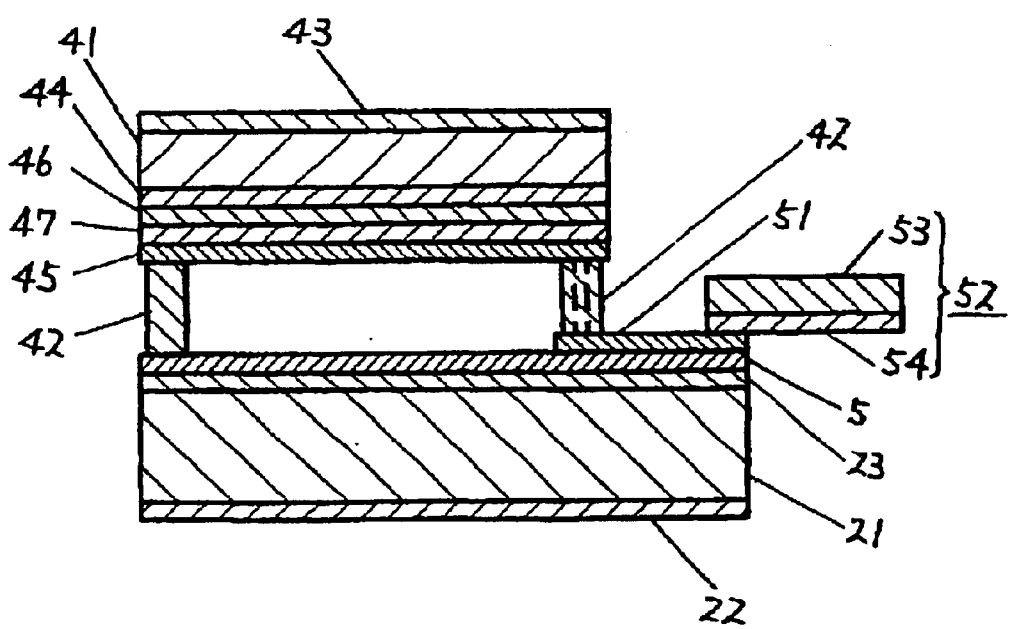
FIG. 6 is a cross section of the transparent touch panel using the transparent substrate with conductive multi-layer antireflection films in Embodiment 3 of the present invention.

FIG. 6 is a section view of the transparent touch panel that uses the conductive transparent substrate with the conductive multi-layer antireflection films in Embodiment 3. Here, the same index numbers are allocated for the elements of the same configuration as FIG. 5 in Embodiment 2, and further detailed explanation is omitted.

In FIG. 6, 21 is a transparent fix substrate at the bottom side of which a hard coat layer 22 is equipped with of main component of acryl resin to prevent damage like scratches of the substrate 21 during production. For example, the chemical substance for the transparent fix substrate 21 is polycarbonate whose thickness is around 1.0 mm.

23 is an undercoat layer of main component acryl on the top surface of the transparent fix substrate 21. This undercoat 23 on the top surface of the transparent fix substrate 21 is covered before the conductive multi-layer films are grown to harden and protect the surface of the substrate 21 from scratches, and furthermore help closer sticking of the grown antireflection film on the substrate 21.

5 is a most exterior conductive $3^{rd}$-layer thin film laid on the undercoat layer on the transparent fix substrate side. The main component of the $3^{rd}$-layer thin film 5 is, for example, ITO, ATO, or FATO. The surface electrical resistance is determined with the thickness of the $3^{rd}$-layer thin film 5, that is, higher resistance is obtained with a thinner film and lower resistance with a thicker film. The electrical resistance is chosen considering the application. The surface resistance is demanded more than 100 $\Omega/\square$ and less than 5000 $\Omega/\square$, further preferably, more than 100 $\Omega/\square$ and less than 1000 $\Omega/\square$. The thickness of the $3^{rd}$-layer film 5 that determines the surface resistance is demanded more than 10 nm and less than 1000 nm, and further preferably more than 20 nm and less than 300 nm.

41 is a transparent flexible substrate situated separately through an insulator film 42 in between facing the conductive antireflection film 31, on the top surface of which is equipped with a hard coat layer 43 of mainly acryl resin with hardness of a 3H pencil on the flexible substrate that protects the flexible substrate 41. The chemical substance of the flexible substrate 41 is, for example, polyethylene terephthalate whose thickness is around 0.175 mm. 44 is a transparent flexible substrate-side undercoat layer made of main component acryl plated on the bottom surface of the transparent flexible substrate 41. This transparent flexible substrate-side undercoat layer 44 is configured so that the undercoat hardens the transparent flexible substrate 41 and protects it from damage like scratches, and further increases sticking force between a later-explaining thin film and the transparent flexible substrate 41. Generally, as the transparent flexible substrate-side undercoat layer 44, is adopted a hard coat that enables surface protection of the transparent flexible substrate 41 and closer stick of the conductive multi-layer antireflection films to the transparent flexible substrate 41.

Alternatively, directly laying the multi-layer antireflection films may be possible on the transparent flexible substrate 41 without the transparent flexible substrate-side undercoat. However, as described above, this method is not preferable considering the surface protection of the conductive multi-layer antireflection thin films and closer sticking. It is preferable for these reasons that the pre-undercoating on the transparent flexible substrate 41 is applied. Instead of hard coat, undercoat using vacuum evaporation on the transparent flexible substrate 41 may be an alternative for surface protection and closer sticking. In any case, the thickness of the undercoat is preferred not to cause optical defects.

46 is a $6^{th}$-layer thin film of transparent dielectric with higher refraction index than that of the transparent flexible substrate 41, that is laid on the bottom surface of the transparent flexible substrate-side undercoat layer 44. The dielectric substance for the $6^{th}$-layer thin film 46 is properly chosen in accordance with the adopted transparent flexible substrate 41, within the refraction index range from 1.5 to 2.5. In practice, for the main component of the $6^{th}$-layer thin film 46 are listed $ZrO_2$ with refraction index 1.90, $TiO_2$ with refraction index 2.20, and $Al_2O_3$ with refraction index 1.60.

The thickness of the $6^{th}$-layer thin film is desired to be more than 10 nm and less than 600 nm, more preferably more than 50 nm and less than 550 nm. Furthermore, considering the controllability of the thickness in the film growth, more than $\lambda/4$ is preferable and considering productivity, less than $\lambda$ is preferable. Thickness either thicker or thinner than this presents poorer antireflection effects.

47 is a $5^{th}$-layer thin film of transparent dielectric with lower refraction index than that of the transparent flexible substrate 41, that is laid on the bottom surface of the transparent $6^{th}$-layer thin film 46. The dielectric substance for the $6^{th}$-layer thin film 46 is properly chosen in accordance with the adopted transparent flexible substrate 41, within the refraction index range from 1.35 to 1.6. In practice, for the main component of the $5^{th}$-layer thin film 47 are listed $SiO_2$ with refraction index 1.46 and $MgF_2$ with refraction index 1.38. The thickness of the $5^{th}$-layer thin film is desired to be more than 10 nm and less than 600 nm, further preferably more than 50 nm and less than 550 nm. Thickness either thicker or thinner than this presents poorer antireflection effects.

45 is a most exterior conductive $4^{th}$-layer thin film laid on the bottom surface of the $5^{th}$ layer 47. The $4^{th}$-layer film 45 is, for example, made of main component such as ITO, ATO, or FATO. The surface electrical resistance is determined with the thickness of the $4^{th}$-layer thin film 45, that is, higher resistance is obtained with a thinner film and lower resistance with a thicker film. The electrical resistance is chosen considering the application. The surface resistance is demanded more than 100 $\Omega/\square$ less than 5000 $\Omega/\square$, further preferably, more than 100 $\Omega/\square$ less than 1000 $\Omega/\square$. The thickness of the $4^{th}$-layer film 45 that determines the surface resistance is demanded more than 10 nm and less than 1000 nm, and further preferably more than 20 nm and less than 300 nm. The 2nd conductive antireflection film 61 consists of at least the $4^{th}$, $5^{th}$, and $6^{th}$-layer thin films 45, 46, and 47 described above.

51 is a connecting plate configured with silver paste that electrically connects the fourth-layer film 45 and the $3^{rd}$-layer thin film 5 in conductive antireflection film 31 and also connects them to an external circuit 52 that will be described later. The external circuit 52 that is connected to the connecting plate 51 is equipped with a flexible circuit board and a desired wiring pattern.

Following is explained operation of the above configured transparent touch panel. When the top surface of the hard-coat layer 43 on the transparent flexible substrate is pushed with a pen or a finger, the pressure is transmitted to the second conductive antireflection film 61 and the transparent fix substrate 21, when the most exterior $3^{rd}$-layer thin film S of the transparent fix substrate 21 contacts the $4^{th}$-layer thin film 45 of the second conductive antireflection film 61. This contact puts the voltage out to the external circuit 52 as the desired control signal in potential proportion with the pressed position according to the loaded voltages at the edges of the $4^{th}$-layer thin film 45 and the $3^{rd}$-layer thin film 5.

Embodiment 4

Figure 7:
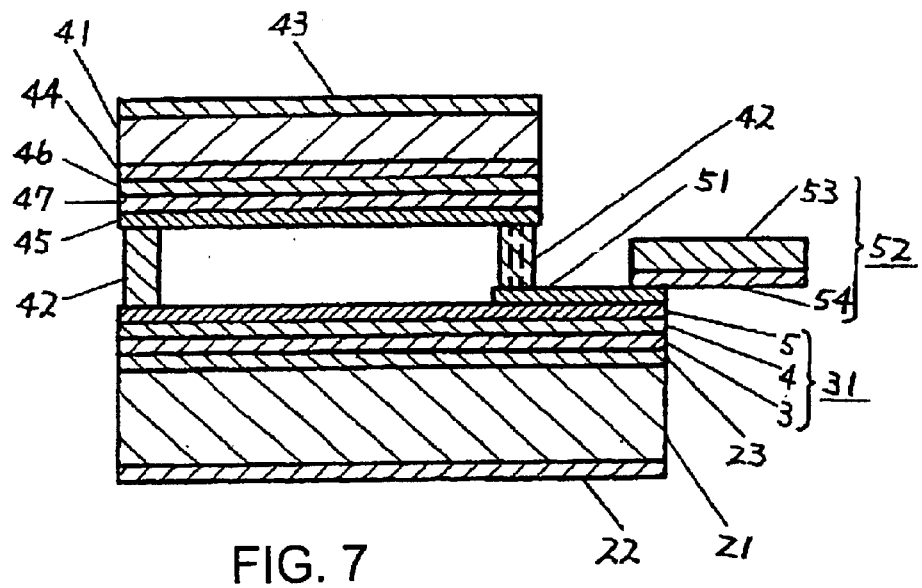
FIG. 7 is a cross section of the transparent touch panel using the transparent substrate with conductive multi-layer antireflection films in Embodiment 4 of the present invention.

In the following, with references of figures, is explained a transparent touch panel using the transparent substrate with conductive multi-layer antireflection film in Embodiment 4. FIG. 7 is a cross section view of the transparent touch panel using the transparent substrate with the conductive multi-layer antireflection film.

The transparent touch panel in Embodiment 4 equips "the transparent flexible substrate 41" in FIG. 5 of Embodiment 2 with "the second conductive antireflection film 61" in FIG. 6 in Embodiment 3. Any other elements of Embodiment 4 are the same as in FIG. 5 of Embodiment 2.

Explanation about Embodiment 4 is restricted on the elements concerning "the transparent flexible substrate 41 set separately facing the conductive antireflection film 31 to the insulator film 42 in between," and the rest is omitted.

In FIG. 4, 41 is a transparent flexible substrate set separately facing the conductive antireflection film 31 to an insulator film 42 in between, and wears a transparent flexible substrate-side hard-coat layer 43 of main component of acryl with hardness of around a 3H pencil to guard the surface from scratches. In practice, chemical substance of the transparent flexible substrate 41 is polyethylene terephthalate or the like, and the thickness of the substrate is around 0.17 mm.

44 is an undercoat layer of main component of acryl on the bottom surface of the transparent flexible substrate 41. This undercoat 44 is coated before the conductive multi-layer films are grown up in order to harden and protect the surface of the substrate 41 from scratches, and furthermore help closer sticking of the grown antireflection films on the substrate 41. Generally, for the undercoat layer 44, is adopted a hard coat that enables surface protection of the transparent flexible substrate 41 and closer sticking of the conductive multi-layer antireflection films to the substrate 41.

Alternatively, directly laying the conductive multi-layer films on the flexible transparent substrate 41 without the undercoat layer 44 on the flexible substrate may be possible. However, as previously described, this method is not preferable considering the surface protection and closer sticking. Pre-process of undercoating a hard coat on the surface of the transparent flexible substrate 41 is preferable for the purposes described above. Instead of the hard coat, simple undercoat using vacuum evaporation on the flexible transparent substrate 41 may be an alternative for surface protection and closer sticking. In any case, the thickness of the undercoat is desired not to cause optical defects 46 is a $6^{th}$-layer thin film of transparent dielectric with higher refraction index than that of the transparent flexible substrate 41, that is laid on the bottom surface of the transparent flexible substrate-side undercoat layer 44. The dielectric substance for the $6^{th}$-layer thin film 46 is properly chosen in accordance with the adopted transparent flexible substrate 41, within the refraction index range from 1.50 to 2.50. In practice, for the main component of the $6^{th}$-layer thin film 46 are listed $ZrO_2$ with refraction index 1.90, $TiO_2$ with refraction index 2.20, and $Al_2O_3$ with refraction index 1.60. The thickness of the $6^{th}$-layer thin film is desired to be more than 10 nm and less than 600 nm, more preferably more than 50 nm and less than 550 nm. Furthermore, considering the controllability of the thickness in the film growth, more than $\lambda/4$ is preferable and considering productivity, less than $\lambda$ is preferable. Thickness either thicker or thinner than this presents poorer antireflection effects.

47 is a $5^{th}$-layer thin film of transparent dielectric with lower refraction index than that of the transparent flexible substrate 41, that is laid on the bottom surface of the transparent $6^{th}$-layer thin film 46. The dielectric substance for the $6^{th}$-layer thin film 46 is properly chosen in accordance with the adopted transparent flexible substrate 41, within the refraction index range from 1.35 to 1.6. In practice, for the main component of the $5^{th}$-layer thin film 47 are listed $SiO_2$ with refraction index 1.46 and $MgF_2$ with refraction index 1.38. The thickness of the $5^{th}$-layer thin film is desired to be more than 10 nm and less than 600 nm, more preferably more than 50 nm and less than 550 nm. Thickness either thicker or thinner than this presents poorer antireflection effects.

45 is a $4^{th}$-layer conductive thin film laid on the most external bottom surface of the $5^{th}$-layer thin film 47. For main components of the $4^{th}$-layer thin film, is listed for example, ITO, ATO, and FATO. The surface electrical resistance is determined with the thickness of the $4^{th}$-layer thin film 45, that is, higher resistance is obtained with a thinner film and lower resistance with a thicker film. The electrical resistance is chosen considering the application. The surface resistance is demanded more than 100 $\Omega/\square$ and less than 5000 $\Omega/\square$, further preferably, more than 100 $\Omega/\square$ and less than 1000 $\Omega/\square$. The thickness of the $4^{th}$-layer thin film 45 that corresponds the surface resistance is demanded more than 10 nm and less than 1000 nm, and further preferably more than 20 nm and less than 300 nm.

The second conductive antireflection film 61 consists of at least the $4^{th}$-layer thin film 45, the $5^{th}$-layer thin film 47, and the $6^{th}$-layer thin films 46 as described above. 51 is a connecting means configured with silver paste that electrically connects the $4^{th}$-layer thin film 45 and the $3^{rd}$-layer thin film 5 in the second conductive antireflection film 61, and also connects them to a later-explaining external circuit 52. The external circuit 52 that is connected to the connecting plate 51 is equipped with a desired wiring pattern 54 on a flexible circuit board 53.

Following is explained operation of the above configured transparent touch panel. When the top surface of the hard-coat layer 43 on the transparent flexible substrate is pushed with a pen or a finger, the pressure is transmitted to the second conductive antireflection film 61 and the 1st conductive antireflection film 31, when the most exterior $3^{rd}$-layer thin film 5 of the 1st conductive antireflection film 31 contacts the $4^{th}$-layer thin film 45 of the second conductive antireflection film 61. This contact puts the voltage out to the external circuit 52 as the desired control signal in potential proportion with the pressed position according to the loaded voltages at the edges of the $4^{th}$-layer thin film 45 and the $3^{rd}$-layer thin film 5 respectively.

Embodiment 5

In the following, with references of figures, is explained a transparent touch panel using the transparent substrate with conductive multi-layer antireflection film in Embodiment 5.

Figure 8:
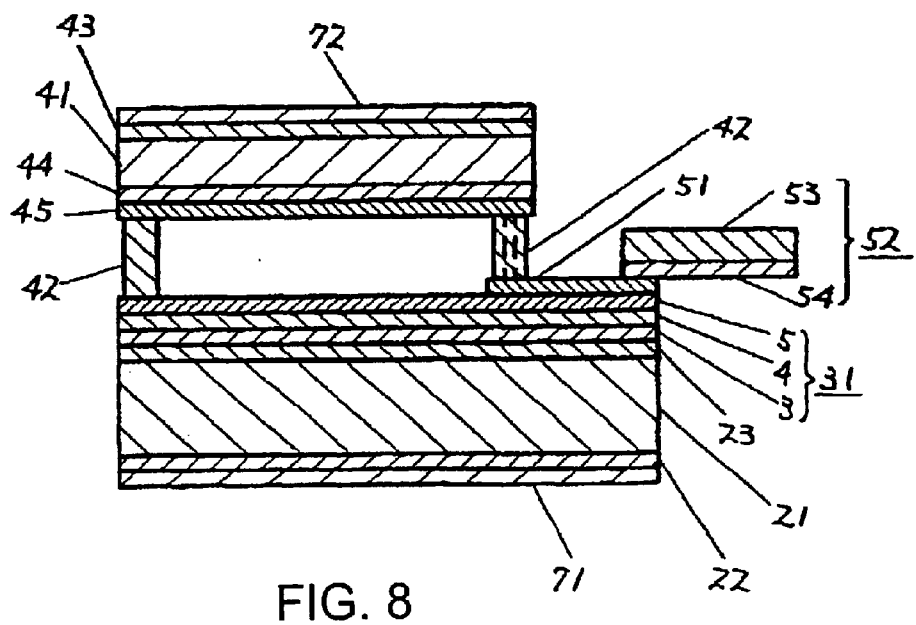
FIG. 8 is a cross section of the transparent touch panel using the transparent substrate with conductive multi-layer antireflection films in Embodiment 5 of the present invention.

FIG. 8 is a cross section view of the transparent touch panel using the transparent substrate with conductive multi-layer antireflection film in Embodiment 5.

The transparent touch panel in Embodiment 5 equips the transparent fix-substrate-side hard-coat layer 22 and the transparent flexible-substrate-side hard-coat layer 43 explained in FIG. 5 of Embodiment 2 with antireflection films on the surfaces of the opposite side against their substrates. Any other elements of Embodiment 5 are the same as in FIG. 5 of Embodiment 2.

The explanation for Embodiment 5 is restricted to the difference from the configuration in FIG. 5 of Embodiment 2, that is, "the transparent fix-substrate-side hard-coat layer 22 and the transparent flexible-substrate-side hard-coat layer 43 both equipped with antireflection films on the surfaces of the opposite side against their substrates," and the rest is omitted.

In FIG. 8, 21 shows a transparent fix substrate at the bottom side of which a hard-coat layer 22 of main component of acryl resin is equipped with to prevent defects like scratches during production of the substrate 21. On the bottom surface of the transparent fix-substrate-side hard-coat layer 22, at opposite side against the substrate 21, a 1st antireflection film 71 is equipped with. The 1st antireflection film 71 is configured as three-layer films by plying $SiO_2$ and $TiO_2$ repeatedly.

Furthermore, 41 is the transparent flexible substrate, on the top surface of which is equipped with a flexible-substrate-side hard-coat layer 43 of mainly acryl resin at hardness of a 3H pencil that protects the flexible substrate 41 against scratches. On the top surface of the transparent flexible-substrate-side hard-coat layer 43, at opposite side against the transparent flexible substrate 41, a second antireflection film 72 is equipped with. The second antireflection film 72 is configured as three layer films by plying $SiO_2$ and $TiO_2$ repeatedly. In Embodiment 5, although the antireflection films are equipped with on both sides of the transparent fix-substrate-side hard-coat layer 22 and the transparent flexible-substrate-side hard-coat layer 43 at the opposite face against the substrate, either side of the layer 22 or 43 will do.

Embodiment 6

In the following, with references of figures, is explained a transparent touch panel using the transparent substrate with conductive multi-layer antireflection film in Embodiment 6.

Figure 9:
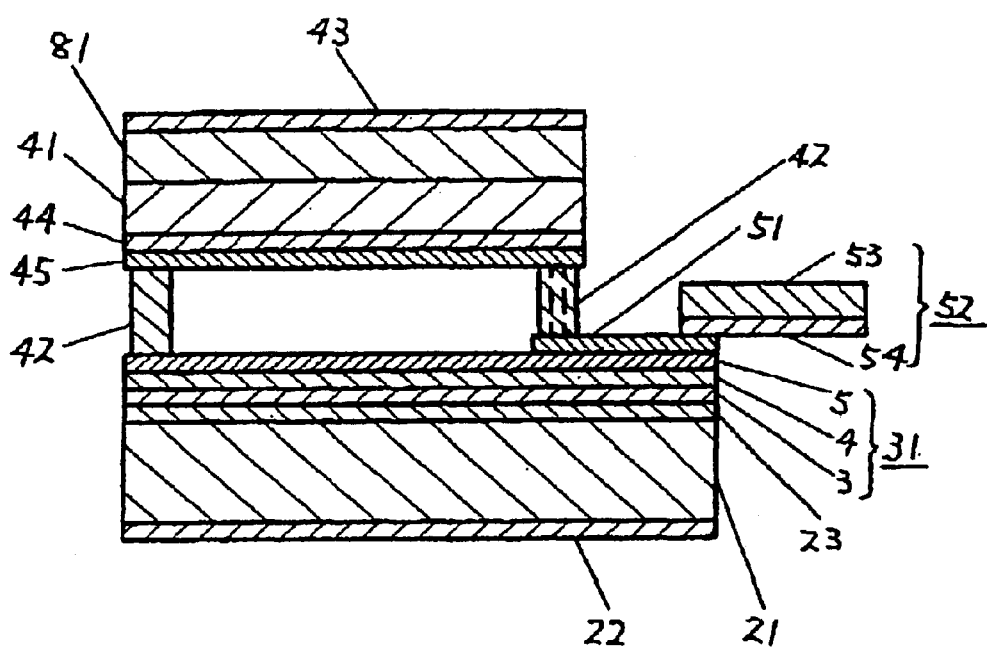
FIG. 9 is a cross section of the transparent touch panel using the transparent substrate with conductive multi-layer antireflection films in Embodiment 6 of the present invention.

FIG. 9 is a cross section view of the transparent touch panel using the transparent substrate with conductive multi-layer antireflection film in Embodiment 6.

The transparent touch panel in Embodiment 6 equips the transparent flexible-substrate-side hard-coat layer 41 and the transparent flexible-substrate-side hard-coat layer 43 with a polarization filter film 81 in between. Any other elements of Embodiment 6 are the same as in FIG. 5 of Embodiment 2.

The explanation for Embodiment 6 is restricted to the difference from the configuration in FIG. 5 of Embodiment 2, that is, "equips the transparent flexible-substrate-side hard-coat layer 41 and the transparent flexible-substrate-side hard-coat layer 43 with a polarization filter film 81 in between," and the rest is omitted.

41 is a transparent flexible substrate consisting of a cyclic olefin hydrocarbons film (Arton, JSR Co. product) with property of low dual-refraction indexes and little diffused reflections, on the top surface of which is equipped with a flexible-substrate-side hard-coat layer 43 out of mainly acryl resin at hardness of a 3H pencil that protects the flexible substrate 41. The polarization filter film 81 is equipped with between the transparent flexible-substrate-side hard-coat layer 41 and the transparent flexible-substrate-side hard-coat layer 43. The polarization filter film 81 reduces the light-beam transmissivity to ½ and accordingly the reflection of the transparent touch panel is reduced to less than ½.

Embodiment 7

In the following, with references of figures, is explained electronic equipment with the transparent touch panel in Embodiment 7. As an example of electronic equipment in Embodiment 7, a handheld computer is explained.

Figure 10:
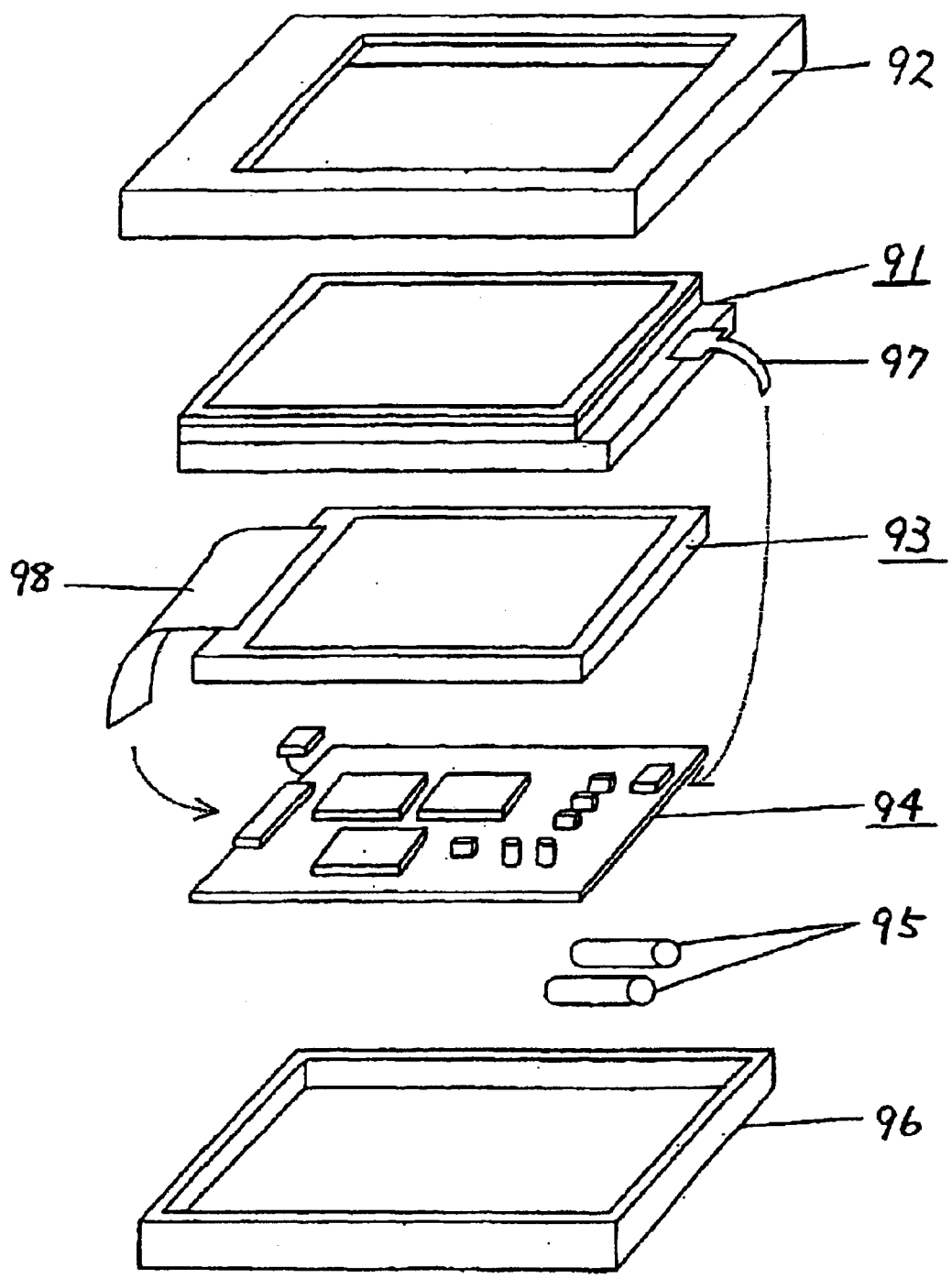
FIG. 10 is an explosive perspective of a handheld computer in Embodiment 7 of the present invention.

FIG. 10 presents an explosive perspective of a handheld computer in Embodiment 7. The transparent touch panel in Embodiment 7 is the same as those explained in FIGS. 5 to 9 in Embodiments 2 to 6, and the detailed explanation is not repeated.

In FIG. 10, 91 is a transparent touch panel attached on the bottom surface of an upper packing case 92. 93 is a liquid crystal display arranged at the lower part of the transparent touch panel 91. 94 is a control-circuit block consisting of electronic devices such as MPU and memories, arranged at the lower part of the liquid crystal display 93. 95 is a battery that feeds the control-circuit block 94. These blocks are held with an upper packing case 92 and a lower packing case 96.

The transparent touch panel 41 and the liquid crystal display 43 are electrically connected to the control-circuit block 94 through the 1st and the second flexible wiring circuits 97 and 98 that are drawn from sides of the packing cases 92 and 96.

The handheld computer configured as above is operable by pushing the upper surface of the transparent touch panel 91 with a pen or a finger. The control-circuit block 94 that includes CPU and memories is set to function for power On/Off, for choice of the software, and for execution of the chosen software, when the liquid crystal display 93 shows each expression following the function. The handheld computer using the touch panel in Embodiment 7 offers very comfortable handling since the touch panel weighs light, is robust against shocks by dropping, durable against an unexpected excess load weight in carrying around, and presents good visibility in showing big complex visual volume such as characters, pictures, drawings, and photos together with excellent input properties of good linearity in input position and long input durability.

APPLICATIONS IN INDUSTRY

The explanation above using references of the Embodiments showed that the transparent substrate with conductive multi-layer antireflection films of the present invention effectively improves transmissivity for visible light even if a plastic substrate with poor transmissivity is used. Accordingly, the present invention effectively provides with conductive multi-layered antireflection thin films of good transmissivity, a transparent touch panel using the films, and electronic equipment using the touch panel.

The invention being thus described, it will be apparent that the same may be varied in many ways. Such variations are not to be regarded as a departure from the spirit and the scope of the invention, and all such modifications as would apparent to one skilled in the art intended to be included within the scope of the following claims.

What is claimed is:

1. A transparent baseboard with conductive multi-layer antireflection films, comprising transparent dielectric thin-film layers of different refractive indices on a transparent substrate, and a most exterior transparent conductive thin-film layer consisting of ITO with at least 20% weight of $SnO_2$.

2. The transparent baseboard with conductive multi-layer antireflection films as defined in claim 1, wherein said transparent conductive thin film consists of said ITO with $SnO_2$ of weight percentage no less than 20% and no more than 30%.

3. The transparent baseboard with conductive multi-layer antireflection films as defined in claim 1, wherein said film incurs linearity loss of no more than 1.5% after undergoing pen-sliding test of 100 thousand times with 250 gram loading weight.

4. The transparent baseboard with conductive multi-layer antireflection films as defined in claim 1, wherein said transparent conductive thin film consists of said ITO with $SnO_2$ of weight percentage more than 20% and lees than 25%.

5. A transparent baseboard with conductive multi-layer transparent films on a transparent substrate, comprising at least three-layer antireflection thin films on the transparent substrate, including a dielectric transparent $1^{st}$-layer thin film on the substrate has a refractive index higher than the substrate, and a transparent dielectric $2^{nd}$-layer thin film on the $1^{st}$-layer has a lower refractive index than the substrate, and the most exterior conductive $3^{rd}$-layer thin film consists of ITO with at least 20% weight of $SnO_2$.

6. The transparent baseboard with conductive multi-layer antireflection films as defined in claim 5, comprising the optical thickness of each layer of the thin films is determined considering the refraction-index relationship between the substrate and the thin film.

7. The conductive transparent baseboard with conductive multi-layer antireflection films as defined in claim 5 wherein the $3^{rd}$-layer thickness meets the desired surface electrical resistance and thickness of the $1^{st}$ and the $2^{nd}$ thin films satisfies the theoretical view-sense reflection index less than a proper value by adjusting their desired thickness as a variable, and the thickness nd of the $1^{st}$ layer meets the inequality nd>$\lambda$/4.

8. The conductive transparent baseboard with conductive multi-layer antireflection films as defined in claim 5 comprising said $3^{rd}$-layer thin film consists of said ITO with $SnO_2$ of weight percentage no less than 20% and no more than 30%.

9. The conductive transparent baseboard with conductive multi-layer antireflection films as defined in claim 5 comprising said $3^{rd}$-layer thin film incurs linearity loss no more than 1.5% after undergoing pen-sliding test of 100 thousand times with 250 gram loading weight.

10. The conductive transparent baseboard with conductive multi-layer antireflection films as defined in claim 5 comprising said $3^{rd}$-layer thin film consists of said ITO with $SnO_2$ of weight percentage more than 20% and less than 25%.

11. Transparent touch panel comprising a transparent fixed substrate, a transparent flexible substrate situated away from the fixed substrate, and connecting means to external electrical circuits on the transparent flexible substrate, wherein either of said facing transparent fixed substrate or said transparent flexible substrate has conductive multi-layer antireflection films of at least 3 layers comprising a $1^{st}$-layer transparent dielectric thin film with refraction index higher than its substrate, a $2^{nd}$-layer transparent dielectric thin film with refraction index lower than its substrate, and a $3^{rd}$-layer conductive transparent thin film of ITO with no less than 20% weight $SnO_2$.

12. The transparent touch panel as defined in claim 11 comprising each layer of said conductive multi-layer antireflection films is respectively laid on said substrate with optical thickness considering refraction indexes of said transparent substrate and each thin film.

13. The transparent touch panel as defined in claim 11 comprising the $3^{rd}$-layer thickness meets a desired surface electrical resistance and thickness of the $1^{st}$ and the second thin films satisfies a theoretical view-sense reflection index less than a proper value by adjusting its desired thickness as a variable, and the thickness nd of the $1^{st}$ layer meets the inequality nd>$\lambda$/4.

14. The transparent touch panel as defined in claim 11 comprising said $3^{rd}$-layer thin film consists of ITO with $SnO_2$ of weight percentage no lest than 20% and no more than 30%.

15. The transparent touch panel as defined in claim 11 comprising said $3^{rd}$-layer thin film incurs linearity loss no more than 1.5% after undergoing pen-sliding test of 100 thousand times with 250 gram loading weight.

16. Electronic equipment comprising a display furnished with a transparent touch panel on the display side, and a control circuit that processes control signals obtained by pushing the transparent touch panel that consists of a transparent fixed substrate, a transparent flexible substrate situated away from the fixed substrate, and connecting means to external electrical circuits on the transparent flexible substrate, wherein either of said facing transparent fixed substrate or said transparent flexible substrate has conductive multi-layer antireflection films of at least 3 layers comprising a $1^{st}$-layer transparent dielectric thin film with refraction index higher than its substrate, a $2^{nd}$-layer transparent dielectric thin film with refraction index lower than its substrate, and a most exterior $3^{rd}$-layer conductive transparent thin film of ITO with no less than 20% weight of $SnO_2$.

* * * * *